United States Patent
Kwon et al.

(10) Patent No.: US 9,077,048 B2
(45) Date of Patent: *Jul. 7, 2015

(54) CABLE-TYPE SECONDARY BATTERY

(71) Applicant: LG Chem, Ltd., Seoul (KR)

(72) Inventors: Yo-Han Kwon, Daejeon (KR); Byung-Hun Oh, Daejeon (KR); Hye-Ran Jung, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/483,318

(22) Filed: Sep. 11, 2014

(65) Prior Publication Data

US 2014/0377613 A1  Dec. 25, 2014

Related U.S. Application Data

(63) Continuation of application No. PCT/KR2014/004042, filed on May 7, 2014.

(30) Foreign Application Priority Data

May 7, 2013  (KR) .................. 10-2013-0051561
May 7, 2014  (KR) .................. 10-2014-0054275

(51) Int. Cl.
*H01M 10/0587*  (2010.01)
*H01M 2/14*  (2006.01)
(Continued)

(52) U.S. Cl.
CPC ........ *H01M 10/0587* (2013.01); *H01M 10/286* (2013.01); *H01M 10/125* (2013.01);
(Continued)

(58) Field of Classification Search
CPC ............ H01M 10/125; H01M 10/286; H01M 10/0422
See application file for complete search history.

(56) References Cited

U.S. PATENT DOCUMENTS

| | | | | |
|---|---|---|---|---|
| 4,522,897 A | * | 6/1985 | Walsh | ............................ 429/119 |
| 5,008,165 A | * | 4/1991 | Schmode | ......................... 429/94 |

(Continued)

FOREIGN PATENT DOCUMENTS

| | | |
|---|---|---|
| JP | 11297360 | 10/1999 |
| JP | 2005038612 A | 2/2005 |

(Continued)

OTHER PUBLICATIONS

International Search Report for Application No. PCT/KR2014/004039 dated Sep. 11, 2014.

(Continued)

*Primary Examiner* — Jeremiah Smith
(74) *Attorney, Agent, or Firm* — Lerner, David, Littenberg, Krumholz & Mentlik, LLP (57) ABSTRACT

The present disclosure provides a cable-type secondary battery, comprising: an inner electrode supporter; and a sheet-form laminate of inner electrode-separation layer-outer electrode, spirally wound on the outer surface of the inner electrode supporter, wherein the laminate of inner electrode-separation layer-outer electrode is formed by carrying out compression for the integration of an inner electrode, a separation layer for preventing a short circuit, and an outer electrode. In the cable-type secondary battery of the present disclosure, since the electrodes and the separation layer are adhered to each other and integrated, the separation layer coming into contact with the electrodes absorbs an electrolyte solution to induce the uniform supply of the electrolyte solution into the outer electrode active material layer, thereby enhancing the stability and performances of the cable-type secondary battery.

29 Claims, 5 Drawing Sheets

(51) Int. Cl.

| | | |
|---|---|---|
| *H01M 4/02* | (2006.01) | |
| *H01M 4/13* | (2010.01) | |
| *H01M 4/70* | (2006.01) | |
| *H01M 10/058* | (2010.01) | |
| *H01M 10/052* | (2010.01) | |
| *H01M 10/0565* | (2010.01) | |
| *H01M 10/0525* | (2010.01) | |
| *H01M 10/0567* | (2010.01) | |
| *H01M 10/0569* | (2010.01) | |
| *H01M 10/28* | (2006.01) | |
| *H01M 10/12* | (2006.01) | |
| *H01M 10/04* | (2006.01) | |
| *H01M 10/0568* | (2010.01) | |

(52) U.S. Cl.
CPC ....... *H01M10/0431* (2013.01); *H01M 10/0568* (2013.01); *H01M 2/14* (2013.01); *H01M 4/02* (2013.01); *H01M 4/13* (2013.01); *H01M 4/70* (2013.01); *H01M 10/04* (2013.01); *H01M 10/058* (2013.01); *H01M 10/052* (2013.01); *H01M 10/0565* (2013.01); *H01M 2220/30* (2013.01); *H01M 2300/0082* (2013.01); *H01M 10/0422* (2013.01); *H01M 10/0525* (2013.01); *H01M 10/0567* (2013.01); *H01M 10/0569* (2013.01); *H01M 2300/0028* (2013.01); *Y02E 60/122* (2013.01)

(56) References Cited

U.S. PATENT DOCUMENTS

| | | | |
|---|---|---|---|
| 5,077,153 | A | 12/1991 | Grange-Cossou et al. |
| 6,280,879 | B1 | 8/2001 | Andersen et al. |
| 6,403,263 | B1 | 6/2002 | Roach |
| 6,723,467 | B2 | 4/2004 | Yoshida et al. |
| 7,682,740 | B2 | 3/2010 | Yong et al. |
| 2001/0053475 | A1 | 12/2001 | Ying et al. |
| 2003/0215716 | A1 | 11/2003 | Suzuki et al. |
| 2005/0112461 | A1 | 5/2005 | Amine et al. |
| 2005/0118508 | A1 | 6/2005 | Yong et al. |
| 2005/0155216 | A1 | 7/2005 | Cho et al. |
| 2006/0008702 | A1 | 1/2006 | Cheon et al. |
| 2006/0110661 | A1 | 5/2006 | Lee et al. |
| 2006/0199294 | A1 | 9/2006 | Fujikawa et al. |
| 2007/0207379 | A1 | 9/2007 | Hatta et al. |
| 2008/0032170 | A1* | 2/2008 | Wainright et al. ............... 429/30 |
| 2008/0089006 | A1 | 4/2008 | Zhong et al. |
| 2009/0107746 | A1 | 4/2009 | Horie et al. |
| 2010/0261065 | A1 | 10/2010 | Babinec et al. |
| 2010/0273051 | A1 | 10/2010 | Choi et al. |
| 2010/0291442 | A1* | 11/2010 | Wang et al. ............... 429/231.95 |
| 2011/0111277 | A1 | 5/2011 | Bessho et al. |
| 2012/0009331 | A1* | 1/2012 | Kwon et al. ............... 427/58 |
| 2012/0034509 | A1* | 2/2012 | Bae et al. ............... 429/145 |
| 2012/0040235 | A1* | 2/2012 | Cho et al. ............... 429/156 |
| 2012/0077109 | A1 | 3/2012 | Hong et al. |
| 2012/0100412 | A1* | 4/2012 | Kwon et al. ............... 429/149 |
| 2012/0107658 | A1 | 5/2012 | Kwon et al. |
| 2012/0115040 | A1* | 5/2012 | Kwon et al. ............... 429/314 |
| 2012/0141877 | A1 | 6/2012 | Choi et al. |
| 2012/0189914 | A1 | 7/2012 | Hara et al. |
| 2012/0295144 | A1 | 11/2012 | Kwon et al. |
| 2013/0011742 | A1 | 1/2013 | Park et al. |
| 2013/0143126 | A1 | 6/2013 | Jung et al. |
| 2013/0288150 | A1* | 10/2013 | Hodges et al. ............... 429/466 |
| 2013/0344363 | A1* | 12/2013 | Upadhyaya ............... 429/94 |
| 2013/0344368 | A1 | 12/2013 | Kwon et al. |
| 2014/0011065 | A1 | 1/2014 | Kwon et al. |
| 2014/0170454 | A1 | 6/2014 | Kwon et al. |
| 2014/0178726 | A1 | 6/2014 | Kwon et al. |
| 2014/0186672 | A1 | 7/2014 | Kwon et al. |
| 2014/0186673 | A1 | 7/2014 | Kwon et al. |
| 2014/0212720 | A1 | 7/2014 | Kwon et al. |
| 2014/0234681 | A1 | 8/2014 | Kwon et al. |
| 2014/0370351 | A1 | 12/2014 | Kwon et al. |

FOREIGN PATENT DOCUMENTS

| | | | | |
|---|---|---|---|---|
| JP | 2007265989 | A | 10/2007 | |
| JP | 2011054502 | A | 3/2011 | |
| KR | 20050043674 | A | 5/2005 | |
| KR | 20050075811 | A | 7/2005 | |
| KR | 100582557 | B1 | 5/2006 | |
| KR | 2008-0005627 | A | 1/2008 | |
| KR | 20080010166 | A | 1/2008 | |
| KR | 20080015373 | A | 2/2008 | |
| KR | 20100117403 | A | 11/2010 | |
| KR | 20100130818 | A | 12/2010 | |
| KR | 20110038038 | A | 4/2011 | |
| KR | 20110136448 | A | 12/2011 | |
| KR | 20120000708 | A | 1/2012 | |
| KR | 20120014542 | A | 2/2012 | |
| KR | 20120094871 | A | 8/2012 | |
| KR | 20130040160 | A | 4/2013 | |
| KR | 20130040166 | A | 4/2013 | |
| KR | 20130045219 | A | 5/2013 | |
| WO | 2005098994 | A1 | 10/2005 | |
| WO | WO 2011/159083 | * | 12/2011 | ........ H01M 10/0568 |
| WO | 2012088643 | A1 | 7/2012 | |

OTHER PUBLICATIONS

International Search Report for Application No. PCT/KR2014/004042 dated Sep. 11, 2014.
International Search Report for Application No. PCT/KR2014/004043 dated Sep. 11, 2014.
International Search Report for Application No. PCT/KR2014/004044 dated Oct. 1, 2014.
International Search Report for Application No. PCT/KR2014/004046 dated Oct. 1, 2014.
International Search Report for Application No. PCT/KR2014/004048 dated Sep. 12, 2014.
International Search Report from PCT/KR2014/003737, dated Aug. 14, 2014.
International Search Report from PCT/KR2014/004047, dated Sep. 3, 2014.
Machine Enlish Translation of JP 2005-038612.
Original Japanese text of JP 2005-038612.
U.S. Appl. No. 14/445,144, filed Jul. 29, 2014.
U.S. Appl. No. 14/472,635, filed Aug. 29, 2014.
U.S. Appl. No. 14/472,692, filed Aug. 29, 2014.
U.S. Appl. No. 14/477,305, filed Sep. 4, 2014.
U.S. Appl. No. 14/477,317, filed Sep. 4, 2014.
U.S. Appl. No. 14/479,713, filed Sep. 8, 2014.
U.S. Appl. No. 14/479,821, filed Sep. 8, 2014.
U.S. Appl. No. 14/479,856, filed Sep. 8, 2014.
U.S. Appl. No. 14/480,914, filed Sep. 9, 2014.
U.S. Appl. No. 14/480,919, filed Sep. 9, 2014.
U.S. Appl. No. 14/480,926, filed Sep. 9, 2014.
U.S. Appl. No. 14/483,328, filed Sep. 11, 2014.
U.S. Appl. No. 14/483,348, filed Sep. 11, 2014.
U.S. Appl. No. 14/483,373, filed Sep. 11, 2014.
U.S. Appl. No. 14/484,401, filed Sep. 12, 2014.
U.S. Appl. No. 14/484,454, filed Sep. 12, 2014.
U.S. Appl. No. 14/484,463, filed Sep. 12, 2014.
U.S. Appl. No. 14/484,472, filed Sep. 12, 2014.
U.S. Appl. No. 14/484,487, filed Sep. 12, 2014.
Y.H. Kwon, S.-W. Woo, H.-R. Jung, H.K. Yu, K. Kim, B.H. Oh, S. Ahn, S.-Y. Lee, S.-Wan Song, J. Cho, H.-C. Shin, J.Y. Kim, Cable-Type Flexible Lithium Ion Battery Based on Hollow Multi-Helix Electrodes, Adv. Mater. 2012, 24, 5192-5197.

\* cited by examiner

CABLE-TYPE SECONDARY BATTERY

CROSS-REFERENCE TO RELATED APPLICATION

This application is a continuation of International Application No. PCT/KR2014/004042 filed on May 7, 2014, which claims priority under 35 USC 119(a) to Korean Patent Application No. 10-2013-0051561 filed in the Republic of Korea on May 7, 2013, and Korean Patent Application No. 10-2014-0054275 filed in the Republic of Korea on May 7, 2014, the disclosure of which is incorporated herein by reference.

TECHNICAL FIELD

The present disclosure relates to a cable-type secondary battery which can freely change in shape, and more specifically to a cable-type secondary battery constructed to comprise an inner electrode supporter, and an integrated laminate of electrodes and a separation layer.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop cable-type batteries having a very high ratio of length to cross-sectional diameter. Korean Patent Application publication No. 2005-99903 discloses a flexible battery consisting of an inner electrode, an outer electrode and an electrolyte layer interposed therebetween. However, such battery has poor flexibility. The linear batteries use a polymer electrolyte to form an electrolyte layer, but this causes difficulties in the inflow of the electrolyte into an electrode active material, thereby increasing the resistance of the batteries and deteriorating the capacity and cycle characteristics thereof.

Also, the cable-type batteries may have spaces that are ununiformly generated among a separation layer interposed between an inner electrode and an outer electrode and such electrodes in the preparation thereof, and such a space may disturb the introduction of an electrolyte solution in an outer electrode active material layer, thereby deteriorating battery performances.

In addition, in the case of cable-type batteries having a wire-form current collector, since a value of line resistance is generally higher than that of sheet resistance, the wire-form current collector may exhibit high resistance as compared with a sheet-form current collector, thereby deteriorating battery performances.

SUMMARY OF THE DISCLOSURE

The present disclosure is designed to solve the problems of the related art, and therefore the present disclosure is directed to providing a secondary battery having a new linear structure, which can easily change in shape, maintain excellent stability and performances as a secondary battery, and facilitate the inflow of an electrolyte into an electrode active material.

In accordance with one aspect of the present disclosure, there is provided a cable-type secondary battery, comprising: an inner electrode supporter; and a sheet-form laminate of inner electrode-separation layer-outer electrode, spirally wound on the outer surface of the inner electrode supporter, wherein the laminate of inner electrode-separation layer-outer electrode is formed by carrying out compression for the integration of an inner electrode, a separation layer for preventing a short circuit, and an outer electrode.

At this time, the sheet-form laminate of inner electrode-separation layer-outer electrode may have a strip structure extending in one direction.

In addition, the sheet-form laminate of separation layer-outer electrode may be spirally wound so that it is not overlapped in its width or so that it is overlapped.

The laminate of inner electrode-separation layer-outer electrode may be formed by maintaining a peel strength of 15 to 300 N/m between the inner electrode and the separation layer or between the separation layer and the outer electrode during compression for the integration thereof.

In accordance with another aspect of the present disclosure, there is provided a cable-type secondary battery, comprising: an inner electrode supporter; a sheet-form inner electrode spirally wound on the outer surface of the inner electrode supporter; and a sheet-form laminate of separation layer-outer electrode, spirally wound on the outer surface of the inner electrode, wherein the laminate of separation layer-outer electrode is formed by carrying out compression for the integration of a separation layer for preventing a short circuit, and an outer electrode.

At this time, the sheet-form laminate of separation layer-outer electrode may have a strip structure extending in one direction.

In addition, the sheet-form laminate of separation layer-outer electrode may be spirally wound so that it is not overlapped in its width or so that it is overlapped.

The laminate of separation layer-outer electrode may be formed by maintaining a peel strength of 15 to 300 N/m between the separation layer and the outer electrode during compression for the integration thereof.

In accordance with another aspect of the present disclosure, there is provided a cable-type secondary battery, comprising: an inner electrode supporter; a sheet-form laminate of inner electrode-separation layer, spirally wound on the outer surface of the inner electrode supporter; and a sheet-form outer electrode wound on the outer surface of the laminate of inner electrode-separation layer, wherein the laminate of inner electrode-separation layer is formed by carrying out compression for the integration of an inner electrode and a separation layer for preventing a short circuit.

At this time, the sheet-form laminate of inner electrode-separation layer may have a strip structure extending in one direction.

In addition, the sheet-form laminate of inner electrode-separation layer may be spirally wound so that it is not overlapped in its width or so that it is overlapped.

The laminate of inner electrode-separation layer may be formed by maintaining a peel strength of 15 to 300 N/m between the inner electrode and the separation layer during compression for the integration thereof.

The inner electrode supporter may have an open structure, and the inner electrode supporter may be in the form of a hollow fiber, a wound wire, a wound sheet or a mesh.

The hollow fiber may be obtained from at least one selected from the group consisting of polyethylene, polypropylene, polytetrafluoroethylene, polyvinylidene fluoride, polyacrylonitrile, polyimide, polyethylene terephthalate, polyamide imide, polyester imide, polyether sulfone, polysulfone and a mixture thereof.

Meanwhile, the inner electrode may comprise an inner current collector and an inner electrode active material layer formed on a surface of the inner current collector, and wherein the outer electrode may comprise an outer current collector and an outer electrode active material layer formed on a surface of the outer current collector.

At this time, the cable-type secondary battery may further comprise a polymer film formed on another surface of the inner current collector or the outer current collector.

Here, the polymer film may be made of any one selected from the group consisting of polyolefin, polyester, polyimide, polyamide and a mixture thereof.

In addition, the inner current collector or the outer current collector may be in the form of a mesh.

In the present disclosure, the separation layer may have a size larger than those of the inner current collector and the outer current collector in the width and the length thereof.

Also, at least one of the inner current collector and the outer current collector may further comprise a primer coating layer consisting of a conductive material and a binder.

At this time, the conductive material may comprise any one selected from the group consisting of carbon black, acetylene black, ketjen black, carbon fiber, carbon nanotube, graphene and a mixture thereof.

In addition, the binder may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxylmethyl cellulose, styrene-butadiene rubber, acrylonitrile-styrene-butadiene copolymer, polyimide and a mixture thereof.

Meanwhile, the inner electrode may further comprise a polymer supporting layer formed on the surface of the inner electrode active material layer.

At this time, the polymer supporting layer may be a porous layer having a pore size of 0.01 to 10 μm and a porosity of 5 to 95%.

In addition, the polymer supporting layer may comprise a linear polymer with polarity, an oxide-based linear polymer or a mixture thereof.

At this time, the linear polymer with polarity may be selected from the group consisting of polyacrylonitrile, polyvinyl chloride, polyvinylidene fluoride (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, poly-p-phenylene terephthalamide and a mixture thereof.

In addition, the oxide-based linear polymer may be selected from the group consisting of polyethylene oxide, polypropylene oxide, polyoxymethylene, polydimethylsiloxane and a mixture thereof.

In addition, the inner current collector or the outer current collector configured in the form of a wound sheet may have a plurality of recesses on at least one surface thereof.

The plurality of recesses may be continuously patterned or intermittently patterned.

The inner current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The conductive material used in the inner current collector may be selected from the group consisting of polyacetylene, polyaniline, polypyrrole, polythiophene, polysulfurnitride, indium tin oxide (ITO), silver, palladium, nickel and a mixture thereof.

The conductive polymer used in the inner current collector may be selected from the group consisting of polyacetylene, polyaniline, polypyrrole, polythiophene, polysulfurnitride and a mixture thereof.

In addition, the outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

Meanwhile, the inner electrode supporter may be a hollow structure whose central part is empty.

At this time, the inner electrode supporter may comprise one or more wire-form inner electrode supporters being spirally wound or one or more sheet-form inner electrode supporters being spirally wound.

In addition, the inner electrode supporter may comprise two or more wire-form inner current collectors being spirally crossed with each other.

In addition, the inner electrode supporter may be provided with a core of inner current collector, a core for supplying lithium ions, which comprises an electrolyte, or a filling core therein.

At this time, the core for supplying lithium ions may comprise a gel polymer electrolyte and a support and may further comprise a liquid electrolyte and a porous carrier.

Meanwhile, the electrolyte which is used in the core for supplying lithium ions may be selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

The electrolyte may further comprise a lithium salt which may be selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof.

Meanwhile, the inner electrode may be an anode or a cathode, and the outer electrode may be a cathode or an anode corresponding to the inner electrode.

When the inner electrode is an anode and the outer electrode is a cathode, the inner electrode active material may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and the outer electrode active material may comprise an active material selected from the group consisting of LiCoO$_2$, LiNiO$_2$, LiMn$_2$O$_4$, LiCoPO$_4$, LiFePO$_4$, LiNiMnCoO$_2$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \le x<0.5$, $0 \le y<0.5$, $0 \le z<0.5$, and $x+y+z \le 1$), and a mixture thereof.

Alternatively, when the inner electrode is a cathode and the outer electrode is an anode, the inner electrode active material may comprise an active material selected from the group consisting of LiCoO$_2$, LiNiO$_2$, LiMn$_2$O$_4$, LiCoPO$_4$, LiFePO$_4$, LiNiMnCoO$_2$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \le x<0.5$, $0 \le y<0.5$, $0 \le z<0.5$, and $x+y+z \le 1$), and a mixture thereof, and the outer electrode active material may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof.

Meanwhile, the separation layer may be an electrolyte layer or a separator.

The electrolyte layer may comprise an electrolyte selected from a gel polymer electrolyte using PEO, PVdF, PMMA, PVdF-HFP, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt.

At this time, the lithium salt may be selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof.

The separator may be a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous polymer substrate made of a mixture of inorganic particles and a binder polymer; or a separator having a porous coating layer formed on at least one surface of the porous polymer substrate and comprising inorganic particles and a binder polymer.

At this time, the porous polymer substrate may be a porous polymer film substrate or a porous non-woven fabric substrate.

Meanwhile, the cable-type secondary battery may further comprise a protection coating surrounding the outer surface of the outer electrode.

Here, the protection coating may be made of a polymer resin.

At this time, the polymer resin may comprise any one selected from the group consisting of PET, PVC, HDPE, an epoxy resin and a mixture thereof.

In addition, the protection coating may further comprise a moisture-blocking layer.

At this time, the moisture-blocking layer may be made of aluminum or a liquid-crystalline polymer.

Further, in accordance with yet still another aspect of the present invention, there is provided a cable-type secondary battery, comprising: a core for supplying lithium ions, which comprise an electrolyte; an open-structured inner electrode supporter surrounding the outer surface of the core for supplying lithium ions; and a sheet-form laminate of inner electrode-separation layer-outer electrode, spirally wound on the outer surface of the inner electrode, wherein the sheet-form laminate of inner electrode-separation layer-outer electrode is formed by carrying out compression for the integration of an inner electrode having an inner current collector and an inner electrode active material layer formed on the surface of the inner current collector, a separation layer for preventing a short circuit, and an outer electrode having an outer current collector and an outer electrode active material layer formed on the surface of the outer current collector.

In addition, in accordance with yet still another aspect of the present invention, there is provided a cable-type secondary battery, comprising: a core for supplying lithium ions, which comprise an electrolyte; an open-structured inner electrode supporter surrounding the outer surface of the core for supplying lithium ions; a sheet-form inner electrode spirally wound on the outer surface of the inner electrode supporter and having an inner current collector and an inner electrode active material layer formed on the surface of the inner current collector; and a sheet-form laminate of separation layer-outer electrode, spirally wound on the outer surface of the inner electrode, wherein the sheet-form laminate of separation layer-outer electrode is formed by carrying out compression for the integration of a separation layer for preventing a short circuit, and an outer electrode having an outer current collector and an outer electrode active material layer formed on the surface of the outer current collector.

In addition, in accordance with yet still another aspect of the present invention, there is provided a cable-type secondary battery, comprising: a core for supplying lithium ions, which comprise an electrolyte; an open-structured inner electrode supporter surrounding the outer surface of the core for supplying lithium ions; a sheet-form laminate of inner electrode-separation layer, spirally wound on the outer surface of the inner electrode supporter; and a sheet-form outer electrode spirally wound on the outer surface of the laminate of inner electrode-separation layer and having an outer current collector and an outer electrode active material layer formed on the surface of the outer current collector, wherein the sheet-form laminate of inner electrode-separation layer is formed by carrying out compression for the integration of an inner electrode having an inner current collector and an inner electrode active material layer formed on the surface of the inner current collector, and a separation layer for preventing a short circuit.

In addition, in accordance with yet still another aspect of the present invention, there is provided a cable-type secondary battery, comprising: two or more inner electrode supporters arranged in parallel to each other; two or more inner electrodes spirally wound on the outer surface of each inner electrode supporter; and a sheet-form laminate of separation layer-outer electrode, spirally wound on the outer surface of the inner electrodes, the laminate of separation layer-outer electrode being formed by carrying out compression for the integration of a separation layer for preventing a short circuit, and an outer electrode.

In addition, in accordance with yet still another aspect of the present invention, there is provided a cable-type secondary, comprising: two or more cores for supplying lithium ions, which comprise an electrolyte; an open-structured inner electrode supporter surrounding the outer surface of each core for supplying lithium ions; two or more inner electrodes spirally wound on the outer surface of each inner electrode supporter and arranged in parallel to each other, each inner electrode having an inner current collector and an inner electrode active material layer formed on the surface of the inner current collector; and a sheet-form laminate of separation layer-outer electrode, spirally wound on the outer surface of the inner electrodes, the laminate of separation layer-outer electrode being formed by carrying out compression for the integration of a separation layer for preventing a short circuit, and an outer electrode having an outer current collector and an outer electrode active material layer formed on the surface of the outer current collector.

Thus, in the cable-type secondary battery of the present disclosure, since the electrodes and the separation layer are adhered to each other and integrated, the separation layer coming into contact with the electrodes absorbs an electrolyte solution to induce the uniform supply of the electrolyte solution into the outer electrode active material layer, thereby enhancing the stability and performances of the cable-type secondary battery.

In addition, the cable-type secondary battery of the present disclosure uses a sheet-form electrode with excluding a wire-form current collector having high resistance, thereby decreasing the resistance of the battery and eventually improving battery performances.

In addition, according to an embodiment of the present disclosure, since the core supplying lithium ion is disposed within an inner electrode supporter having an open structure, the electrolyte of the core for supplying lithium ions can be easily impregnated into an electrode active material layer, thereby facilitating the supply and exchange of lithium ions, and eventually providing superior capacity and cycle characteristics.

Further, the cable-type secondary battery of the present disclosure has the open-structured inner electrode supporter and the sheet-form laminate of electrode-separation layer spirally wound in the form of a spring, thereby maintaining a linear shape and reducing stress from external forces.

BRIEF DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

EXPLANATION OF REFERENCE NUMERALS 1, 110, 210, 310, 410: Core for supplying lithium ions
2, 120, 220, 320, 420: Inner electrode supporter
5: Outer electrode
7: Inner electrode
10, 130: Laminate of inner electrode-separation layer-outer electrode
11, 21, 332: Outer current collector
12, 22, 331: Outer electrode active material layer
13, 23, 33: Separation layer
14, 34, 232, 432: Inner electrode active material layer
15, 35, 231, 431: Inner current collector 20, 230, 430: Laminate of separation layer-outer electrode
30, 330: Laminate of inner electrode-separation layer
100, 200, 300, 400: Cable-type secondary battery
140, 240, 340, 440: Protection coating

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Conventional cable-type secondary batteries have an electrolyte layer which is interposed between an inner electrode and an outer electrode. In order for the electrolyte layer to isolate the inner electrode from the outer electrode and prevent a short circuit, the electrolyte layer is required to be made of gel-type polymer electrolytes or solid polymer electrolytes having a certain degree of mechanical properties. However, such gel-type polymer electrolytes or solid polymer electrolytes fail to provide superior performances as a source for lithium ions, so an electrolyte layer made of such should have an increased thickness so as to sufficiently provide lithium ions. Such a thickness increase in the electrolyte layer widens an interval between the electrodes to cause resistance increase, thereby deteriorating battery performances.

In order to solve this problem, there is an attempt to provide a core supplying lithium ion and comprising a lithium salt within an inner electrode supporter having an open structure, so that the electrolyte of the core for supplying lithium ions can pass through the inner electrode supporter to reach an inner electrode active material layer and an outer electrode active material layer.

However, owing to the presence of uneven parts in the inner electrode supporter, there are spaces between an inner electrode and a separation or between the separation layer and an outer electrode. In this case, the spaces may disturb the introduction of an electrolyte solution in the inner or outer electrode active material layers. For this reason, secondary batteries have exhibited ununiform discharging behaviors, making it difficult to achieve the desired battery performances.

Accordingly, the present inventors have endeavored to solve such a problem and the problem has overcome by providing a laminate consisting of an electrode and a separation layer being integrated by pre-adhesion in the batteries so as to uniformly maintain spaces between the electrode and the separation layer, thereby allowing for the separation layer coming into contact with an electrode active material layer to absorb an electrolyte solution from the inner electrode and induce the uniform supply of the electrolyte solution into the outer electrode active material layer.

Meanwhile, if a wire-form current collector is used in batteries, since a value of line resistance is generally higher than that of sheet resistance, the wire-form current collector may exhibit high resistance as compared with a sheet-form current collector, thereby deteriorating battery performances. However, the present invention uses a sheet-form current collector as an inner current collector and an outer current collector, thereby decreasing the resistance of the battery and eventually improving battery performances.

A cable-type secondary battery according to an embodiment of the present disclosure includes an inner electrode supporter; and a sheet-form laminate of inner electrode-separation layer-outer electrode, spirally wound on the outer surface of the inner electrode supporter, wherein the laminate of inner electrode-separation layer-outer electrode is formed by carrying out compression for the integration of an inner electrode, a separation layer for preventing a short circuit, and an outer electrode.

In addition, a cable-type secondary battery according to another embodiment of the present disclosure includes an inner electrode supporter; a sheet-form inner electrode spirally wound on the outer surface of the inner electrode supporter; and a sheet-form laminate of separation layer-outer electrode, spirally wound on the outer surface of the inner electrode, wherein the laminate of separation layer-outer electrode is formed by carrying out compression for the integration of a separation layer for preventing a short circuit, and an outer electrode.

In addition, a cable-type secondary battery according to another embodiment of the present disclosure includes an inner electrode supporter; a sheet-form laminate of inner electrode-separation layer, spirally wound on the outer surface of the inner electrode supporter; and a sheet-form outer electrode wound on the outer surface of the laminate of inner electrode-separation layer, wherein the laminate of inner electrode-separation layer is formed by carrying out compression for the integration of an inner electrode and a separation layer for preventing a short circuit. Here, the term 'spirally' used herein refers to represent a helix shape that turns around at a certain area while moving, including general spring forms.

At this time, the sheet-form laminate of inner electrode-separation layer-outer electrode, the sheet-form laminate of separation layer-outer electrode, and the sheet-form laminate of inner electrode-separation layer may have a strip structure extending in one direction.

In addition, the sheet-form laminate of inner electrode-separation layer-outer electrode, the sheet-form laminate of separation layer-outer electrode, and the sheet-form laminate of inner electrode-separation layer may be spirally wound so that it is not overlapped in its width. At this time, each sheet-form laminate may be spirally wound with space within the double length of its width so that it is not overlapped, in order to prevent the performance of the battery from deteriorating.

In addition, the sheet-form laminate of inner electrode-separation layer-outer electrode, the sheet-form laminate of separation layer-outer electrode, and the sheet-form laminate of inner electrode-separation layer may be spirally wound so that it is overlapped in its width. At this time, each sheet-form laminate may be spirally wound so that the width of its overlapped part is within 0.9 folds of the width of the each sheet-form laminate, in order to suppress excessive increase of an internal resistance of the battery.

Figure 1:
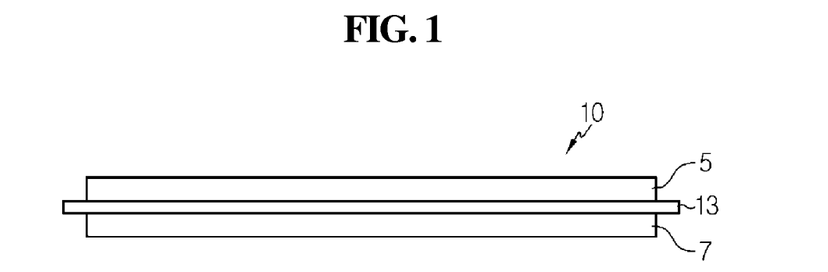
FIGS. 1 and 2 show a sheet-form laminate of inner electrode-separation layer-outer electrode according to an embodiment of the present disclosure.
Figure 3:
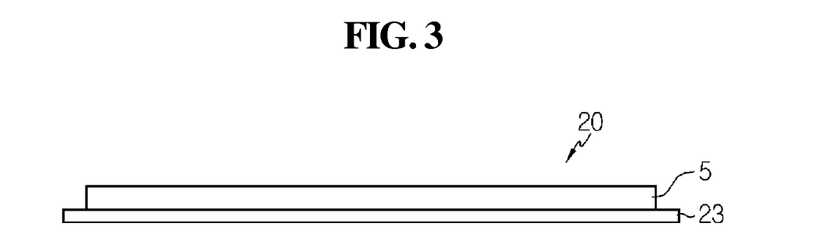
FIGS. 3 and 4 show a sheet-form laminate of separation layer-outer electrode according to an embodiment of the present disclosure.
Figure 5:
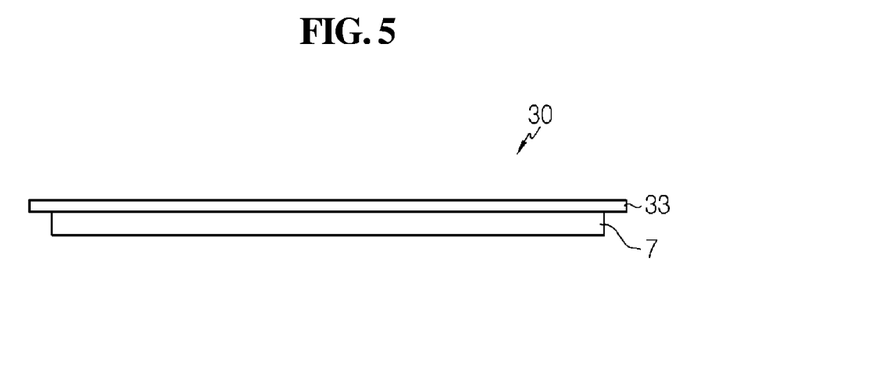
FIGS. 5 and 6 show a sheet-form laminate of inner electrode-separation layer according to an embodiment of the present disclosure.

Referring to FIGS. 1, 3 and 5, the laminate of an electrode and a separation layer according to the present disclosure may be a laminate 10 of inner electrode-separation layer-outer electrode formed by carrying out compression for the integration of an outer electrode 5, a separation layer 13 and an inner electrode 7; a laminate 20 of separation layer-outer electrode formed by carrying out compression for the integration of an outer electrode 5 and a separation layer 23; or a laminate 30 of inner electrode-separation layer formed by carrying out compression for the integration of a separation layer 33 and an inner electrode 7.

Figure 2:
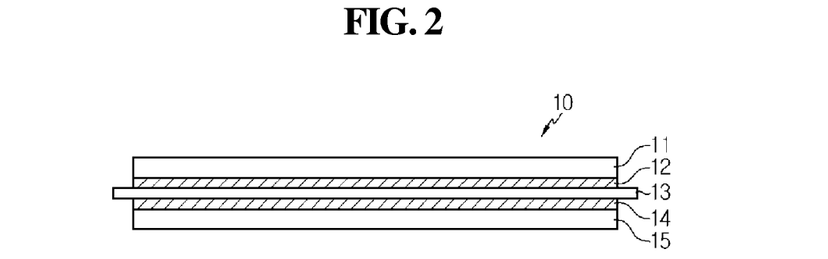
Figure 4:
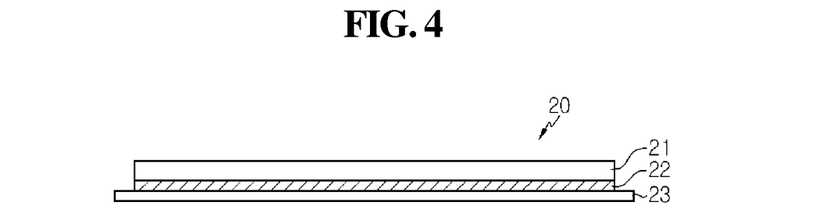
Figure 6:
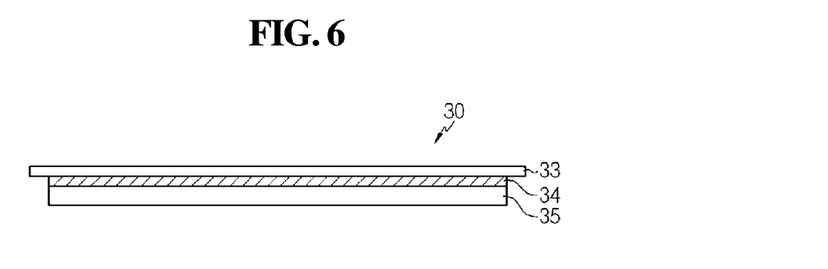

More preferably, referring to FIGS. 2, 4 and 6, the laminate consisting of an electrode and a separation layer according to the present disclosure may be a laminate 10 of inner electrode-separation layer-outer electrode formed by compressing an outer current collector 11, an outer electrode active material layer 12, a separation layer 13, an inner electrode active material layer 14 and an inner current collector 15 for the integration thereof; a laminate 20 of separation layer-outer electrode formed by compressing an outer current collector 21, an outer electrode active material layer 22 and a separation layer 23 for the integration thereof; or a laminate 30 of inner electrode-separation layer formed by compressing a separation layer 33, an inner electrode active material layer 34 and an inner current collector 35 for the integration thereof.

More specifically, the laminate 10 of inner electrode-separation layer-outer electrode may be formed by stacking the inner electrode, the separation layer and the outer electrode which are slit in the length direction thereof and laminating them by way of roll press.

When the electrode active material layer comprises a binder and the separation layer is a separator comprising the binder and inorganic mixture, the binder of the electrode active material layer or the binder release from the separator may provide stronger adhesiveness in an interface between the separation layer and the electrodes.

In the present disclosure, the laminate 10 of inner electrode-separation layer-outer electrode may be formed by maintaining a peel strength of 15 to 300 N/m between the inner electrode 7 and the separation layer 13 or between the separation layer 13 and the outer electrode 5 during compression for the integration thereof, the laminate 20 of separation layer-outer electrode may be formed by maintaining a peel strength of 15 to 300 N/m between the separation layer 23 and the outer electrode 5 during compression for the integration thereof, and the laminate 30 of inner electrode-separation layer may be formed by maintaining a peel strength of 15 to 300 N/m between the inner electrode 7 and the separation layer 33 during compression for the integration thereof. When each peel strength satisfies such a range, an adequate adhesiveness between the separation layer and the electrodes can be obtained without separation thereof, thereby achieving good integration of the separation layer and the electrodes.

In conventional cable-type secondary batteries provided with a separation layer, a sheet-form separation layer is generally formed by winding on the outer surface of an inner electrode, and at this time, both boundaries of the separation layer may be overlapped with each other, so overlapped areas and non-overlapped areas may be present in the separation layer.

If the separation layer is wound without overlapping in both boundaries thereof, the boundaries of the separation layer may be detached when the cable-type secondary batteries are bent or twisted, from which the inner electrode may come into contact with the outer electrode to cause a short circuit. For the purpose of preventing this problem, if the separation layer is wound so that both boundaries thereof are overlapped, the thickness of the separation layer becomes increased to cause other problems, for example, the ionic conductivity of batteries may be reduced.

In contrast, the present invention uses the laminate of a separation layer and an electrode being integrated by pre-adhesion. That is, such a laminate of separation layer-electrode layer can be used in a cable-type battery to prevent an internal short circuit due to the contact of an inner electrode and an outer electrode because the separation layer and the electrode can integrally move even though the cable-type battery is bent. As a result, the flexibility of the battery can be enhanced and the separation layer is minimized from overlapping in both boundaries thereof, thereby providing good ionic conductivity and contributing to the improvement of battery performances.

Furthermore, since the separation layer and the electrodes are integrated according to the present disclosure, the separation layer can acts as a buffer against external stress applied to an electrode active material layer, thereby preventing the release of an electrode active material from the electrode current collector even though extreme bending stress is applied to the electrodes.

Figure 7:
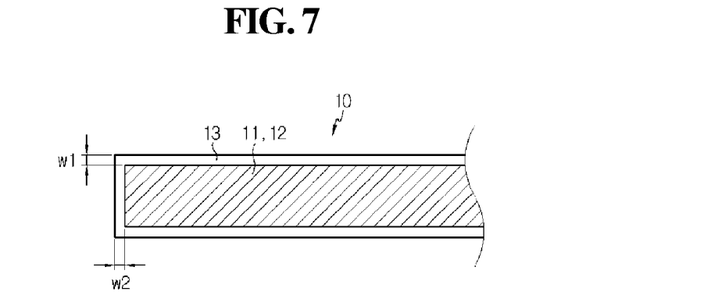
FIG. 7 shows a sheet-form laminate of inner electrode-separation layer-outer electrode according to an embodiment of the present disclosure.
Figure 8:
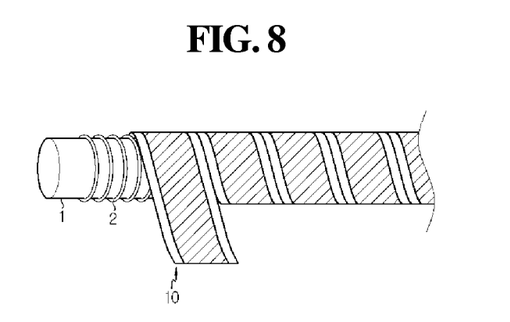
FIG. 8 schematically shows an inner electrode supporter and a sheet-form laminate of inner electrode-separation layer-outer electrode wound on the outer surface of the supporter, according to an embodiment of the present disclosure.

For example, referring to FIGS. 7 and 8, a sheet-form laminate 10 of inner electrode-separation layer-outer electrode may be formed by laminating an inner electrode (not shown), a separation layer 13 and an outer electrode 11, 12 by way of compression for their integration, in which the separation layer 13 may be designed to have a size larger than those of the inner electrode (not shown) and the outer electrode 11, 12 in the width and the length thereof, thereby preventing a short circuit between the inner electrode (not shown) and the outer electrode 11, 12. More specifically, a width difference (w1) and a length difference (w2) between the separation layer 13 and the inner electrode or outer electrode may each be 0.1 mm or more.

Then, the sheet-form laminate 10 of inner electrode-separation layer-outer electrode is wound on the outer surface of an inner electrode supporter 12 surrounding a core for supplying lithium ions, thereby preparing a cable-type battery.

Meanwhile, the inner electrode supporter may have an open structure.

The term 'an open-structure' used herein means that a structure has an open boundary surface through which a substance may be transferred freely from the inside of the structure to the outside thereof.

In the present disclosure, the open-structured inner electrode supporter may be in the form of a hollow fiber, a wound wire, a wound sheet or a mesh, and also the supporter may have pores on the surface thereof, allowing the free movement of an electrolyte solution into the inner electrode active material layer and the outer electrode active material layer to provide good wetting.

The open-structured inner electrode supporter can maintain the linear shape of the cable-type secondary battery and can prevent the disruption or deformation of the electrode structure, thereby ensuring the flexibility of the cable-type secondary battery.

The hollow fiber may be obtained from at least one selected from the group consisting of polyethylene, polypropylene, polytetrafluoroethylene, polyvinylidene fluoride, polyacrylonitrile, polyimide, polyethylene terephthalate, polyamide imide, polyester imide, polyether sulfone, polysulfone and a mixture thereof, through conventional hollow fiber preparations.

Also, the wound inner electrode supporter may be in the form of a spring made of a polymer or a metal. The polymer may be one having good chemical resistance to be not react with an electrolyte solution, and the metal may be the same as a metal used in the inner current collector or outer current collector which will be described below.

The inner electrode supporter may have a diameter of 0.1 to 10 mm and pores with a diameter of 100 nm to 10 μm on the surface thereof.

The inner electrode may comprise an inner current collector and an inner electrode active material layer formed on a surface of the inner current collector, and the outer electrode may comprise an outer current collector and an outer electrode active material layer formed on a surface of the outer current collector.

At this time, a polymer film formed on another surface of the inner current collector or the outer current collector may be further provided.

Here, the polymer film may be made of any one selected from the group consisting of polyolefin, polyester, polyimide, polyamide and a mixture thereof.

In addition, the outer current collector is in the form of a mesh.

If a wire-form current collector is used in the electrode of cable-type secondary batteries, it is not suitable because it has a surface area smaller than that of a wound sheet or a wound mesh, and is not favorable in terms of increased resistance factors, thereby deteriorating the rate characteristics of the battery over battery resistance during high-rate charging and discharging.

Meanwhile, when cable-type secondary batteries are subject to external forces by bending or twisting, an electrode active material layer may be released from a current collector. For this reason, large amounts of binder components are used in the electrode active material layer so as to provide flexibility in electrodes. However, large amounts of binder may be easily peeled off owing to swelling by an electrolyte solution, thereby deteriorating battery performances.

Accordingly, for the purpose of improving adhesiveness between an electrode active material layer and a current collector, at least one of the inner current collector and the outer current collector may further comprise a primer coating layer consisting of a conductive material and a binder.

At this time, the conductive material used in the conductive layer may comprise any one selected from the group consisting of carbon black, acetylene black, ketjen black, carbon fiber, carbon nanotube, graphene and a mixture thereof.

In addition, the binder may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

Meanwhile, the inner electrode may further comprise a polymer supporting layer formed on the surface of the inner electrode active material layer.

In the case that the inner electrode active material layer further comprises a polymer supporting layer on the surface thereof, in accordance with one embodiment of the present disclosure, it is possible to prevent crack occurrence even when the cable-type secondary battery is bent by external force. Thereby, the release of the inner electrode active material layer can be prevented to minimize the deterioration of battery performances. Furthermore, the polymer supporting layer may have a porous structure which allows good introduction of an electrolyte solution in the inner electrode active material layer, thereby preventing an electrode resistance rise.

In the present disclosure, the polymer supporting layer may comprise a linear polymer with polarity, an oxide-based linear polymer or a mixture thereof.

The linear polymer with polarity may be selected from the group consisting of polyacrylonitrile, polyvinyl chloride, polyvinylidene fluoride (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, poly-p-phenylene terephthalamide and a mixture thereof.

The oxide-based linear polymer may be selected from the group consisting of polyethylene oxide, polypropylene oxide, polyoxymethylene, polydimethylsiloxane and a mixture thereof.

Also, the polymer supporting layer may be a porous layer having a pore size of 0.01 to 10 μm and a porosity of 5 to 95%.

Such a porous structure of the polymer supporting layer may be formed by phase separation or phase change using a non-solvent during its preparation.

For example, polyvinylidene fluoride-co-hexafluoro propylene as a polymer is added to acetone used as a solvent to obtain a solution having 10 wt % of solids. To the solution obtained, water or ethanol as a non-solvent is added in an amount of 2 to 10 wt % to form phase-separated parts of the non-solvent and the polymer.

Among these, the parts of the non-solvent become pores. Accordingly, the size of pores can be controlled depending on the solubility of the non-solvent and the polymer and the amount of the non-solvent.

Also, the inner current collector and the outer current collector configured in the form of a wound sheet may have a plurality of recesses on at least one surface thereof so as to more increase its surface area. The recesses may be continuously patterned or intermittently patterned. That is, continuous patterned recesses may be formed with spacing apart with each other in the longitudinal direction, or a plurality of holes may be formed in the form of intermittent patterns. The plurality of holes may be a circular or polygonal shape.

Meanwhile, the inner current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

Such a current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), silver, palladium, nickel, etc. The conductive polymer may include polyacetylene, polyaniline, polypyrrole, polythiophene, polysulfurnitride, etc. However, the non-conductive polymer used for the current collector is not particularly limited to its kinds.

In addition, the outer current collector of the present disclosure may be made of stainless steel, aluminum, nickel, titanium, sintered carbon, or copper; stainless steel treated with carbon, nickel, titanium or silver on the surface thereof;

an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube. At this time, the conductive material and the conductive polymer may be made of the same material as those employed in the inner current collector described above.

Meanwhile, the inner electrode supporter may be a hollow structure whose central part is empty.

At this time, the inner electrode supporter comprised in the inner electrode supporter may be one or more wires being spirally wound or one or more sheets being spirally wound.

In addition, the inner electrode supporter may be two or more wires being spirally crossed with each other.

In addition, the inner electrode supporter may be provided with a core of the inner current collector therein.

At this time, the core of inner current collector may be made of carbon nanotube, stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer.

In addition, the inner electrode supporter may be provided with a core for supplying lithium ions, which comprises an electrolyte therein.

At this time, the core for supplying lithium ions may comprise a gel polymer electrolyte and a support.

Also, the core for supplying lithium ions may comprise a liquid electrolyte and a porous carrier.

In addition, the inner electrode supporter may be provided with a filling core therein.

The filling core may be made of several materials for improving various performances of cable-type batteries, for example polymer resins, rubber and inorganics, besides materials forming the core of inner current collector and the core for supplying lithium ions, and also may have various forms including wire, fiber, powder, mesh and foam.

Figure 9:
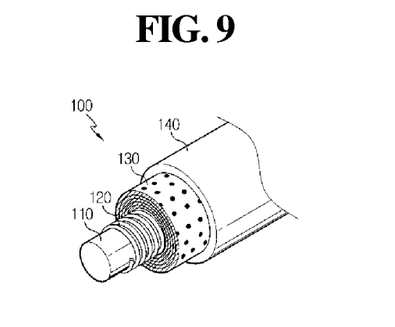
FIG. 9 shows a cable-type secondary battery comprising an inner electrode supporter and a sheet-form laminate of inner electrode-separation layer-outer electrode according to an embodiment of the present disclosure.
Figure 10:
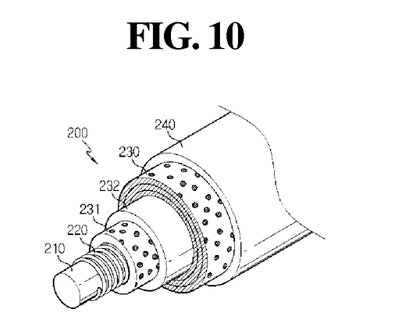
FIG. 10 shows a cable-type secondary battery comprising an inner electrode supporter and a sheet-form laminate of separation layer-outer electrode according to an embodiment of the present disclosure.
Figure 11:
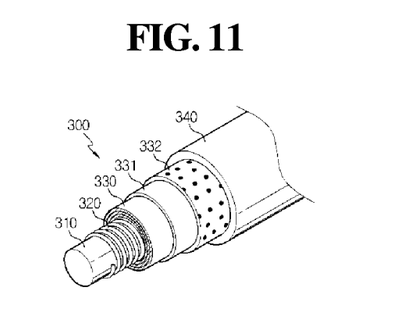
FIG. 11 shows a cable-type secondary battery comprising an inner electrode supporter and a sheet-form laminate of inner electrode-separation layer according to an embodiment of the present disclosure.

Hereinafter, referring to FIGS. 9 to 11, a cable-type secondary battery 100 according to an embodiment of the present invention comprises a core 110 for supplying lithium ions, which comprises an electrolyte; an open-structured inner electrode supporter 120 surrounding the outer surface of the core 110 for supplying lithium ions; and a sheet-form laminate 130 of inner electrode-separation layer-outer electrode, spirally wound to surround the outer surface of the inner electrode supporter 120, wherein the laminate 130 of inner electrode-separation layer-outer electrode is formed by carrying out compression for the integration of an inner electrode having an inner current collector and an inner electrode active material layer formed on the surface of the inner current collector, a separation layer for preventing a short circuit, and an outer electrode having an outer current collector and an outer electrode active material layer formed on the surface of the outer current collector.

Also, a cable-type secondary battery 200 according to another aspect of the present invention comprises a core 210 for supplying lithium ions, which comprises an electrolyte; an open-structured inner electrode supporter 220 surrounding the outer surface of the core 210 for supplying lithium ions; a sheet-form inner electrode spirally wound on the outer surface of the inner electrode supporter 220 and having an inner current collector 231 and an inner electrode active material layer 232 formed on the surface of the inner current collector; and a sheet-form laminate 230 of separation layer-outer electrode, spirally wound on the outer surface of the inner electrode, wherein the laminate 230 of separation layer-outer electrode is formed by carrying out compression for the integration of a separation layer for preventing a short circuit, and an outer electrode having an outer current collector and an outer electrode active material layer formed on the surface of the outer current collector.

In addition, a cable-type secondary battery 300 according to still another aspect of the present invention comprises a core 310 for supplying lithium ions, which comprises an electrolyte; an open-structured inner electrode supporter 320 surrounding the outer surface of the core 310 for supplying lithium ions; a sheet-form laminate 330 of inner electrode-separation layer, spirally wound on the outer surface of the inner electrode supporter 320; and a sheet-form outer electrode spirally wound on the outer surface of the laminate 330 of inner electrode-separation layer and having an outer current collector 332 and an outer electrode active material layer 331 formed on the surface of the outer current collector 332, wherein the laminate 330 of inner electrode-separation layer is formed by carrying out compression for the integration of an inner electrode having an inner current collector and an inner electrode active material layer formed on the surface of the inner current collector and a separation layer for preventing a short circuit.

The cable-type secondary battery of the present disclosure has a horizontal cross section of a predetermined shape, a linear structure, which extends in the longitudinal direction, and flexibility, so it can freely change in shape. The term 'a predetermined shape' used herein is not limited to any particular shape, and refers to any shape that does not damage the nature of the present disclosure.

Meanwhile, the core 110, 210, 310 for supplying lithium ions comprises an electrolyte which is not particularly limited to its kinds and may be selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc). Also, the electrolyte may further comprise a lithium salt which may be selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof. The core 110, 210, 310 for supplying lithium ions may consist of only an electrolyte, and especially a liquid electrolyte may be formed by using a porous carrier.

In the present disclosure, the inner electrode may be an anode or a cathode, and the outer electrode may be a cathode or an anode corresponding to the inner electrode.

The electrode active material layers of the present disclosure allow ions to move through the current collector, and the movement of ions is caused by the interaction of ions such as intercalation/deintercalation of ions into and from the electrolyte layer.

Such electrode active material layers may be divided into an anode active material layer and a cathode active material layer.

Specifically, when the inner electrode is an anode and the outer electrode is a cathode, the inner electrode active material layer may comprise an anode active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and the outer electrode active material layer may comprise a cathode active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Alternatively, when the inner electrode is a cathode and the outer electrode is an anode, the inner electrode active material layer becomes a cathode active material layer and the outer electrode active material layer becomes an anode active material layer.

An electrode active material layer generally comprises an electrode active material, a binder and a conductive material and is combined with a current collector to construct an electrode. When the electrode is subject to deformation, e.g., folding or severe bending by external forces, the electrode active material layer is released, thereby deteriorating battery performances and battery capacity. In contrast, in an electrode comprising the wound sheet-form outer current collector of the present disclosure, such a deformation is less induced because the wound sheet-form outer current collector has elasticity to disperse the external forces applied in the electrode. From this, the release of an active material can be prevented.

In the present disclosure, the separation layer may be an electrolyte layer or a separator.

The electrolyte layer serving as an ion channel may be made of a gel-type polymer electrolyte using PEO, PVdF, PVdF-HFP, PMMA, PAN or PVAc, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a support. The support may be a porous support or a cross-linked polymer to improve poor mechanical properties. The electrolyte layer of the present invention can serve as a separator, and thus an additional separator may be omitted.

In the present disclosure, the electrolyte layer may further comprise a lithium salt. The lithium salt can improve an ionic conductivity and response time. Non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Examples of the separator may include, but is not limited to, a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer formed on at least one surface of the porous polymer substrate and comprising inorganic particles and a binder polymer.

In the porous coating layer formed from inorganic particles and a binder polymer, the inorganic particles are bound to each other by the binder polymer (i.e., the binder polymer connects and immobilizes the inorganic particles), and also the porous coating layer maintains the state of binding with the first supporting layer by the binder polymer, In such a porous coating layer, the inorganic particles are filled in contact with each other, from which interstitial volumes are formed between the inorganic particles. The interstitial volumes between the inorganic particles become empty spaces to form pores.

Among these, in order for the lithium ions of the core for supplying lithium ions to be transferred to the outer electrode, it is preferred to use a non-woven fabric separator corresponding to the porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates.

Also, the cable-type secondary battery of the present disclosure has a protection coating. The protection coating acts as an insulator and is formed to surround the outer current collector, thereby protecting the electrodes against moisture in the air and external impacts. The protection coating 140, 240, 340 may be made of conventional polymer resins having a moisture-blocking layer. The moisture-blocking layer may be made of aluminum or a liquid-crystalline polymer which have good water-blocking ability, and the polymer resins may be PET, PVC, HDPE or epoxy resins.

Hereinafter, a cable-type secondary battery according to one embodiment of the present invention and the preparation thereof will be briefly explained with reference to FIG. 9.

A cable-type secondary battery 100 according to one embodiment of the present invention comprises a core 110 for supplying lithium ions, which comprises an electrolyte; an open-structured inner electrode supporter 120 surrounding the outer surface of the core 110 for supplying lithium ions; and a sheet-form laminate 130 of inner electrode-separation layer-outer electrode, spirally wound on the outer surface of the inner electrode supporter 120, wherein the laminate 130 of inner electrode-separation layer-outer electrode is formed by carrying out compression for the integration of an inner electrode having an inner current collector and an inner electrode active material layer formed on the surface of the inner current collector, a separation layer for preventing a short circuit, and an outer electrode having an outer current collector and an outer electrode active material layer formed on the surface of the outer current collector.

First, the core 110 for supplying lithium ions is obtained by providing a polymer electrolyte in the form of a wire using an extruder. Also, the core 110 for supplying lithium ions may be formed by providing a hollow inner electrode supporter and introducing a non-aqueous electrolyte solution in the center of the inner electrode supporter, or may be formed by providing a battery assembly comprising a protection coating and all and introducing a non-aqueous electrolyte solution in the center of the inner electrode support comprised in the battery assembly. Alternatively, the core 110 for supplying lithium ions may be prepared by providing a wire-form carrier made of a sponge material and introducing a non-aqueous electrolyte solution thereto.

Then, the wire-form inner electrode supporter 120 is provided and wound on the core 110 for supplying lithium ions.

Next, the sheet-form inner electrode and the sheet-form outer electrode are obtained by forming an inner current electrode active material layer and an outer electrode active material layer by way of coating on a sheet-form inner current collector and a sheet-form outer current collector, respectively. The coating may be carried out by conventional coating methods, for example, by an electroplating process or an anodic oxidation process. Also, it is preferable to carry out coating methods in which an electrode slurry containing an active material is applied through a comma coater or a slot die coater. In addition, the electrode slurry containing an active material may be applied by way of dip coating or extrusion-coating using an extruder.

Subsequently, the laminate 130 of inner electrode-separation layer-outer electrode is formed by interposing a separation layer consisting of a polymer electrolyte layer between the sheet-form inner electrode and the sheet-form outer electrode, followed by lamination. At this time, a mesh-form current collector may be used as the inner current collector and the outer current collector.

Then, the laminate 130 of inner electrode-separation layer-outer electrode thus formed is wound on the outer surface of the inner electrode supporter 120 to obtain an electrode assembly, and the protection coating 140 is formed to surround the outer surface of the electrode assembly.

The protection coating 140 is an insulator and is formed on the outermost surface for the purpose of protecting the electrodes against moisture in the air and external impacts. As the protection coating 140, conventional polymer resins, for example, PVC, HDPE and epoxy resins may be used.

Hereinafter, another embodiment of the present disclosure will be briefly explained.

A cable-type secondary battery according to one embodiment of the present invention comprises two or more inner electrode supporters arranged in parallel to each other; two or more inner electrodes spirally wound on the outer surface of each inner electrode supporter; and a sheet-form laminate of separation layer-outer electrode, spirally wound on the outer surface of the inner electrodes, the laminate of separation layer-outer electrode being formed by carrying out compression for the integration of a separation layer for preventing a short circuit, and an outer electrode.

Figure 12:
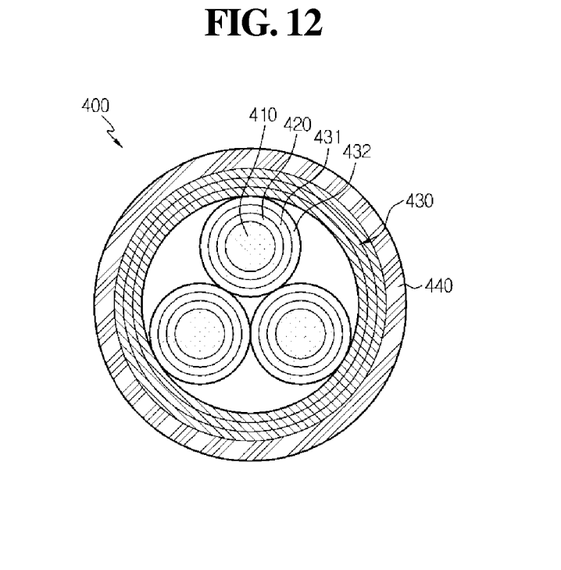
FIG. 12 shows a cross-section of a cable-type secondary battery having multiple inner electrodes according to the present disclosure.

Further, referring to FIG. 12, a cable-type secondary battery 400 according to one embodiment of the present invention comprises two or more cores 410 for supplying lithium ions, which comprise an electrolyte; an open-structured inner electrode supporter 420 surrounding the outer surface of each core 410 for supplying lithium ions; two or more inner electrodes spirally wound on the outer surface of each inner electrode supporter 420 and arranged in parallel to each other, each inner electrode having an inner current collector 431 and an inner electrode active material layer 432 formed on the surface of the inner current collector 431; and a sheet-form assembly 430 of a separation layer-an outer electrode, spirally wound on the outer surface of the inner electrodes, the assembly of a separation layer-an outer electrode being formed by carrying out compression for the integration of a separation layer for preventing a short circuit, and an outer electrode having an outer current collector and an outer electrode active material layer formed on the surface of the outer current collector.

In the cable-type secondary battery 400 which has a plurality of inner electrodes, the number of the inner electrodes can be adjusted to control the loading amount of the electrode active material layers as well as battery capacity, and a probability of short circuit can be prevented owing to the presence of multiple electrodes.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

EXAMPLE

Four Cu-wires having a diameter of 250 μm were wound with crossing with each other to obtain an open-structured inner electrode supporter in which a hollow core for supplying lithium ions in the form of a spring can be present.

Then, 70 wt % of graphite as an anode active material, 5 wt % of Denka black as a conductive material and 25 wt % of PVdF as a binder were mixed to obtain an anode active material-containing slurry. The slurry was coated on a Cu-foil and slit into a piece with a width of 2 mm, to obtain a sheet-form inner electrode (anode).

Meanwhile, 80 wt % of $LiCoO_2$ as a cathode active material, 5 wt % of Denka black as a conductive material and 15 wt % of PVdF were mixed to obtain a cathode active material-containing slurry. The slurry was coated on an Al-foil and slit into a piece with a width of 2 mm, to obtain a sheet-form outer electrode (cathode).

Next, the sheet-form inner electrode was adhered with a sheet-form separator consisting of a porous substrate obtained from inorganic particles and a binder polymer, followed by lamination by using a roll press, to obtain a sheet-form laminate of the inner electrode and the separator being integrated by adhesion.

The laminate of the inner electrode and the separator thus obtained was wound on the outer surface of the open-structured inner electrode supporter.

Subsequently, the sheet-form outer electrode was wound on the outer surface of the wound laminate of the inner electrode and the separator. Then, on the outer surface of the wound outer electrode, a heat-shrinkable tube having a moisture-blocking layer was applied and contracted with heat, to form a protection coating layer.

Then, a non-aqueous electrolyte solution (1M $LiPF_6$, EC:PC=1:1 (volume ratio)) was introduced in the center of the inner electrode using a syringe, to form a core for supplying lithium ions, followed by completely sealing. Thereby, a cable-type secondary battery was prepared.

Comparative Example

The procedures of Example 1 were repeated except that the sheet-form inner electrode was wound on the outer surface of the inner electrode supporter and the separator was wound on the outer surface of the wound sheet-form inner electrode, instead of the step of wining the laminate of the inner electrode and the separator on the outer surface of the open-structured inner electrode supporter, to prepare a cable-type secondary battery.

Evaluation of Battery Performances

For the cable-type secondary batteries prepared in the Example and the Comparative Example, 100 cycles of charge/discharge processes were carried out with a current density of 0.3 C at a voltage condition of 4.2 to 3.0 V, so as to confirm life characteristics and a voltage profile to normal capacity.

Figure 13:
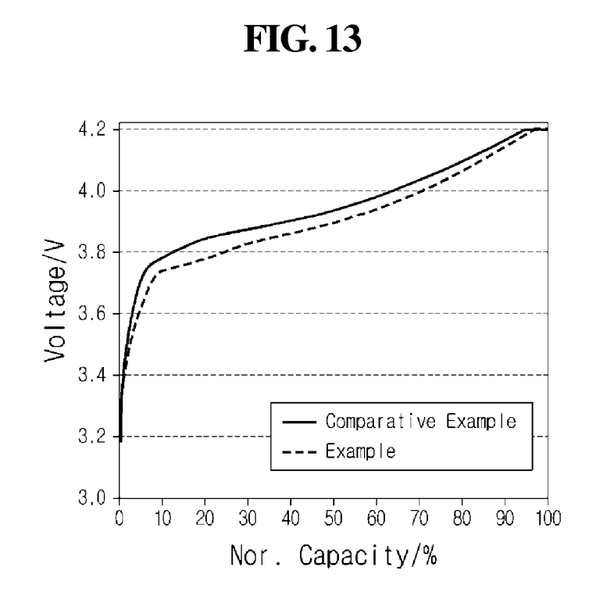
FIG. 13 is a graph showing a voltage profile to normal capacity during charging of cable-type secondary batteries prepared in the Example and the Comparative Example of the present disclosure.
Figure 14:
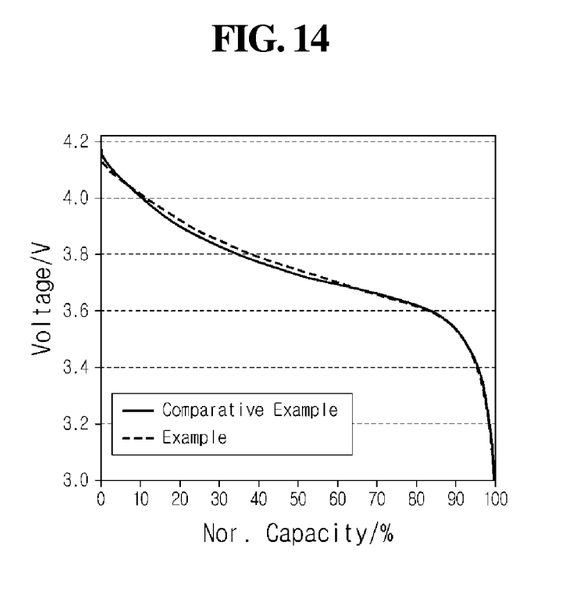
FIG. 14 is a graph showing a voltage profile to normal capacity during discharging of cable-type secondary batteries prepared in the Example and the Comparative Example of the present disclosure.

FIGS. 13 and 14 are each a graph showing a voltage profile to normal capacity during charging and discharging of cable-type secondary batteries prepared in the Example and the Comparative Example of the present disclosure. From these, it was confirmed that the cable-type secondary battery of the Example exhibited resistance decrease as compared with the Comparative Example.

Figure 15:
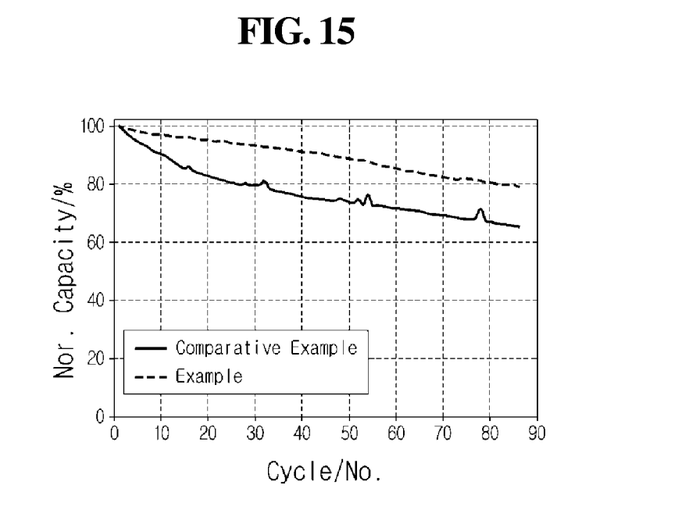
FIG. 15 is a graph showing the cycle life characteristics of cable-type secondary batteries prepared in the Example and the Comparative Example of the present disclosure.

Also, FIG. 15 is a graph showing the cycle life characteristics of cable-type secondary batteries prepared in the Example and the Comparative Example of the present disclosure. From this, it was confirmed that the cable-type secondary battery of the Example exhibited an increase in rate retention ratio, i.e., superior life characteristics, as compared with the Comparative Example.

According to the results above, a laminate of a separation layer and an electrode is applied in cable-type secondary batteries to minimize spaces between the electrode and the separation layer through integration, thereby improving the impregnation of an electrolyte solution into the micropores of the separation layer. From this, the resistance of the cable-type secondary batteries can decrease and the life characteristics thereof can be improved.

APPLICABILITY TO THE INDUSTRY

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A cable-type secondary battery, comprising:
   an inner electrode supporter; and
   a sheet-form laminate of inner electrode-separation layer-outer electrode, helically wound on an outer surface of the inner electrode supporter,
   wherein the laminate of inner electrode-separation layer-outer electrode is formed by carrying out compression for the integration of an inner electrode, a separation layer for preventing a short circuit, and an outer electrode, wherein a peel strength between the inner electrode and the separation layer or between the separation layer and the outer electrode is 15 to 300 N/m.

2. The cable-type secondary battery according to claim 1, wherein the sheet-form laminate of inner electrode-separation layer-outer electrode has a strip structure extending in one direction.

3. The cable-type secondary battery according to claim 1, wherein the sheet-form laminate of inner electrode-separation layer-outer electrode is helically wound so that it does not overlap itself.

4. The cable-type secondary battery according to claim 3, wherein the sheet-form laminate of inner electrode-separation layer-outer electrode is helically wound so that each pass of its helical winding is separated by a space.

5. The cable-type secondary battery according to claim 1, wherein the sheet-form laminate of inner electrode-separation layer-outer electrode is helically wound so that it overlaps itself.

6. The cable-type secondary battery according to claim 5, wherein the sheet-form laminate of inner electrode-separation layer-outer electrode is helically wound so that a width of its overlapped part is less than or equal to 90% of a width of the sheet-form laminate of inner electrode-separation layer-outer electrode.

7. The cable-type secondary battery according to claim 1, wherein the inner electrode supporter has an open structure or a hollow structure whose central part is empty.

8. The cable-type secondary battery according to claim 7, wherein the inner electrode supporter is in the form of a hollow fiber, a wound wire, a wound sheet or a mesh.

9. The cable-type secondary battery according to claim 8, wherein the hollow fiber is obtained from at least one selected from the group consisting of polyethylene, polypropylene, polytetrafluoroethylene, polyvinylidene fluoride, polyacrylonitrile, polyimide, polyethylene terephthalate, polyamide imide, polyester imide, polyether sulfone, polysulfone and a mixture thereof.

10. The cable-type secondary battery according to claim 7, wherein the inner electrode supporter comprises two or more wire-form inner electrode supporters being helically crossed with each other.

11. The cable-type secondary battery according to claim 7, wherein the inner electrode supporter is provided with a core of inner current collector, a core for supplying lithium ions, which comprises an electrolyte, or a filling core therein.

12. The cable-type secondary battery according to claim 11, wherein the core of inner current collector is made of carbon nanotube, stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

13. The cable-type secondary battery according to claim 11, wherein the core for supplying lithium ions comprises a gel polymer electrolyte and a support.

14. The cable-type secondary battery according to claim 11, wherein the core for supplying lithium ions comprises a liquid electrolyte and a porous carrier.

15. The cable-type secondary battery according to claim 11, wherein the electrolyte is selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP);
   a gel polymer electrolyte using PEG, PVdF, PVdF-HFP, PMMA, PAN, or PVAc; and
   a solid electrolyte using PEG, polypropylene oxide (PPG), polyether imine (PEI), polyethylene sulphide (PES), or polyvinyl acetate (PVAc).

16. The cable-type secondary battery according to claim 11, wherein the electrolyte further comprises a lithium salt.

17. The cable-type secondary battery according to claim 16, wherein the lithium salt is selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof.

18. The cable-type secondary battery according to claim 11, the filling core is made of polymer resins, rubber and inorganics in the form of a wire, a fiber, a powder, a mesh or a foam.

19. The cable-type secondary battery according to claim 1, wherein the separation layer is an electrolyte layer or a separator.

20. The cable-type secondary battery according to claim 19, wherein the electrolyte layer comprises an electrolyte selected from a gel polymer electrolyte using PEO, PVdF, PMMA, PVdF-HFP, PAN, or PVAc; and a solid electrolyte using PEO, polypropylene oxide (PPO), polyether imine (PEI), polyethylene sulphide (PES), or polyvinyl acetate (PVAc).

21. The cable-type secondary battery according to claim 19, wherein the electrolyte layer further comprises a lithium salt.

22. The cable-type secondary battery according to claim 19, wherein the separator is a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous polymer substrate made of a mixture of inorganic particles and a binder polymer; or a separator having a porous coating layer formed on at least one surface of the porous polymer substrate and comprising inorganic particles and a binder polymer.

23. The cable-type secondary battery according to claim 22, wherein the porous polymer substrate is a porous polymer film substrate or a porous non-woven fabric substrate.

24. The cable-type secondary battery according to claim 1, which further comprises a protection coating surrounding the outer surface of the outer electrode.

25. The cable-type secondary battery according to claim 24, wherein the protection coating is made of a polymer resin.

26. The cable-type secondary battery according to claim 25, wherein the polymer resin comprises any one selected from the group consisting of PET, PVC, HDPE, an epoxy resin and a mixture thereof.

27. The cable-type secondary battery according to claim 25, wherein the protection coating further comprises a moisture-blocking layer.

28. The cable-type secondary battery according to claim 27, wherein the moisture-blocking layer is made of aluminum or a liquid-crystalline polymer.

29. A cable-type secondary battery, comprising:
  a core for supplying lithium ions, which comprise an electrolyte;
  an open-structured inner electrode supporter surrounding an outer surface of the core for supplying lithium ions; and
  a sheet-form laminate of inner electrode-separation layer-outer electrode, helically wound on an outer surface of the inner electrode supporter,
  wherein the sheet-form laminate of inner electrode-separation layer-outer electrode is formed by carrying out compression for the integration of an inner electrode having an inner current collector and an inner electrode active material layer formed on a surface of the inner current collector, a separation layer for preventing a short circuit, and an outer electrode having an outer current collector and an outer electrode active material layer formed on a surface of the outer current collector, wherein a peel strength between the inner electrode and the separation layer or between the separation layer and the outer electrode is 15 to 300 N/m.

* * * * *